Aug. 11, 1953
B. L. MESSINGER ET AL
2,648,490
SUPERCHARGER DUCT SYSTEM
Filed Oct. 4, 1947
3 Sheets-Sheet 2
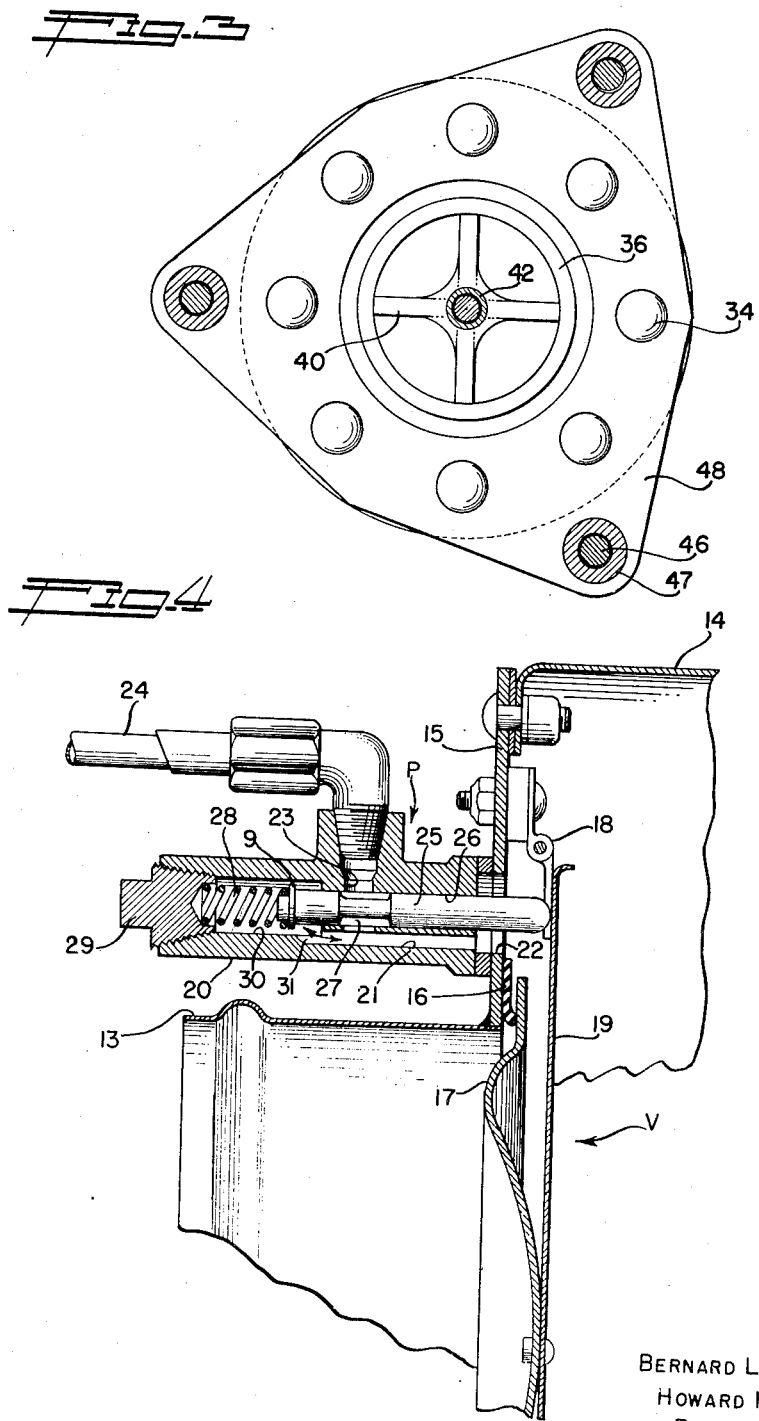
INVENTORS
BERNARD L. MESSINGER
HOWARD H. GRAY
ROBERT R. RICHOLT
By George Sullivan
Agent Aug. 11, 1953  B. L. MESSINGER ET AL  2,648,490
SUPERCHARGER DUCT SYSTEM
Filed Oct. 4, 1947  3 Sheets-Sheet 3
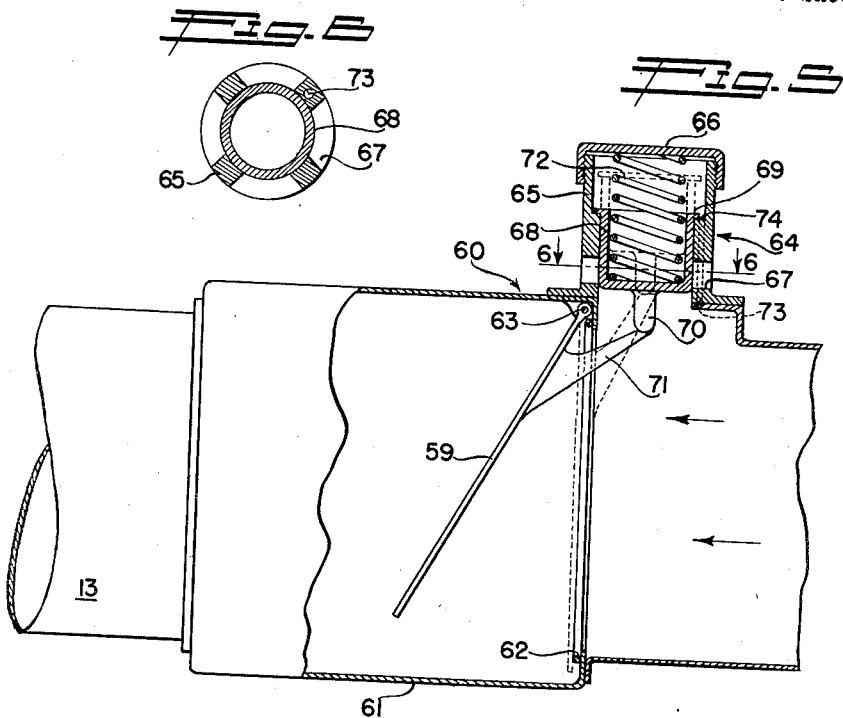
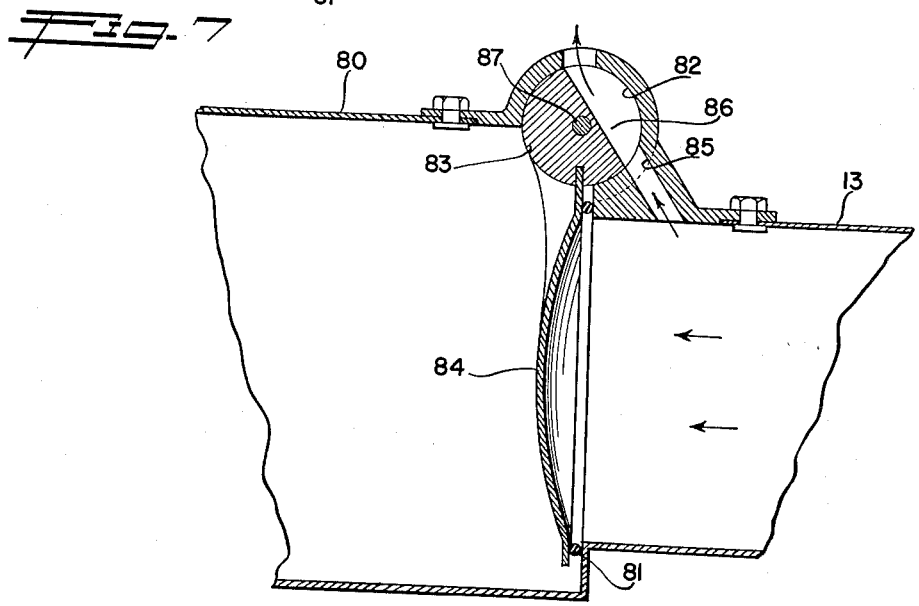
INVENTORS
BERNARD L. MESSINGER
HOWARD H. GRAY
ROBERT R. RICHOLT
By George C. Sullivan
Agent Patented Aug. 11, 1953

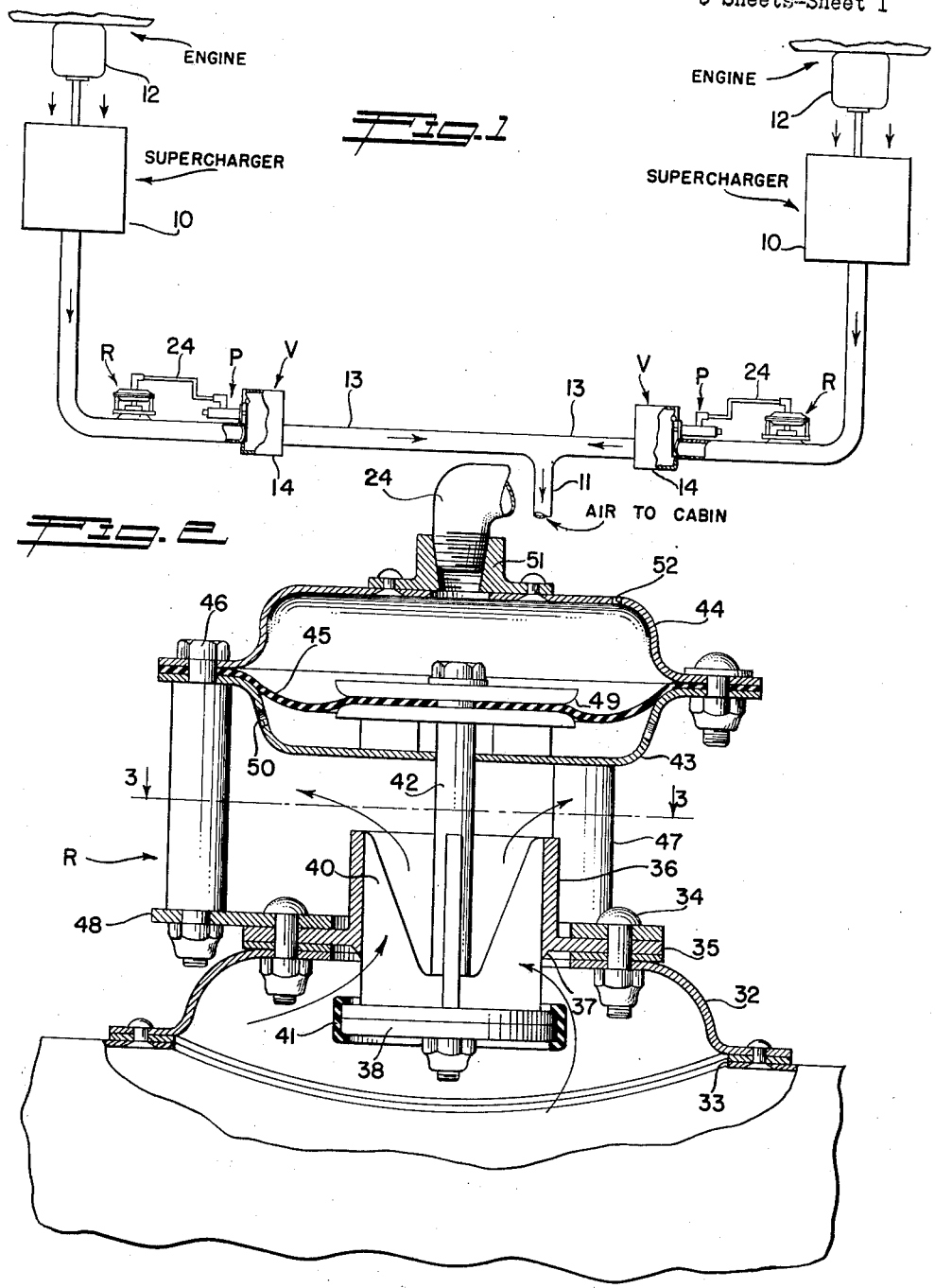

2,648,490

UNITED STATES PATENT OFFICE 2,648,490

SUPERCHARGER DUCT SYSTEM

Bernard L. Messinger, Pacific Palisades, Howard H. Gray, San Fernando, and Robert R. Richolt, Tujunga, Calif., assignors to Lockheed Aircraft Corporation, Burbank, Calif.

Application October 4, 1947, Serial No. 777,936

4 Claims. (Cl. 230—115)

This invention relates to apparatus for supplying air under pressure to enclosures and has more particular reference to the duct systems for conveying air under pressure from superchargers to the cabins of airplanes for the purpose of pressurizing the same.

The habitable compartments or cabins of modern high altitude aircraft must be pressurized or supplied with air under pressure during high altitude flight to assure the comfort and well being of the occupants or passengers. It is the general practice to employ superchargers driven by the propulsive engines of the airplane to develop the air pressure required for this purpose. A common duct system usually connects the discharge sides of the superchargers with the compartment or cabin and the latter is equipped with a regulable outflow valve so that there may be a continuous flow of air under pressure through the compartment to maintain proper ventilation and the required internal cabin pressure. The discharge ducts of the superchargers are also equipped with check valves for preventing a reverse flow of air in the ducts so that air pressure in the cabin will not escape in the event one or more of the superchargers are not functioning. In certain installations it has been found that when the air flow from a supercharger falls below a given value, that supercharger overheats due to insufficient cooling and is likely to be damaged. Such a decrease in the airflow through any one or all of the superchargers of the system may result from various causes such as blocking or restricting of the duct system, a substantial difference in the speed of operation of the engines driving the superchargers, closing of the check valves, etc., and such causes may persist for a sufficient time to bring about serious injury to the affected supercharger or superchargers.

It is an object of the present invention to provide a supercharger duct system of the class above referred to embodying practical and thoroughly dependable means for maintaining or reestablishing air flow through the superchargers when the flow through the discharge ducts of the same falls below a value required for proper supercharger cooling, and which maintains a sufficient flow through the affected superchargers to preserve such cooling so long as the flow through the ducts remains at such a low value. The system of the invention includes an automatically operated relief valve or flow maintaining value for the discharge duct of each supercharger and a control or pilot means for each relief valve so constructed and arranged as to open the related relief valve when the air flow through the respective supercharger discharge duct falls below a given value. The opening of the relief valve allows a sufficent flow of air through the supercharger to properly cool the same even though the air flow from the discharge duct of the particular supercharger may be greatly restricted or even terminated.

Another object of the invention is to provide a system of the character referred to in which the relief valves are controlled or operated by a flow sensitive device so as to maintain adequate cooling air flow through the superchargers irrespective of the pressure conditions existing in the discharge ducts. Air flow of sufficient value to adequately cool the superchargers must be maintained at all times regardless of the prevailing pressures in the ducts and in accordance with the invention flow sensing or flow responsive devices substantially unaffected by pressure, control the relief valves.

Another object of the invention is to provide a supercharger duct system of the type described in which the check valves in the discharge ducts of the superchargers serve as the flow sensitive devices for controlling the related relief valves. The discharge duct of each supercharger is provided with a check valve to prevent the loss of pressure from the cabin or enclosure when the related supercharger is for any reason made idle and the invention utilizes the closures or doors of the check valves as flow sensing devices to control the relief valves which maintain flow through the superchargers even though the check valves are closed.

A further object of the invention is to provide a system of the character mentioned in which the valves do not "hunt" or oscillate but have an "over-center" action so as to assume the open and closed positions without oscillating.

Other objects and features of the invention will become apparent from the following detailed description of typical preferred embodiments, throughout which description reference is made to the accompanying drawings in which:

Figure 1 is a diagrammatic view of a supercharger cabin air supply system embodying one form of the present invention;

Figure 2 is an enlarged fragmentary sectional view illustrating one of the relief valves of the system illustrated in Figure 1;

Figure 3 is a transverse sectional view taken substantially as indicated by line 3—3 on Figure 2;

Figure 4 is an enlarged fragmentary sectional view illustrating a portion of one of the check valves and showing the related pilot valve;

Figure 5 is a fragmentary sectional view of a check valve and relief valve of another form of the invention;

Figure 6 is a transverse sectional view taken as indicated by line 6—6 on Figure 5; and Figure 7 is a view similar to Figure 6 illustrating still another form of the invention.

In the drawings we have shown the invention associated with a supercharger system embodying two superchargers 10 for supplying air under pressure to a common duct 11. It is to be understood that the invention may well be incorporated in a system employing one supercharger, three or more superchargers, and with the superchargers arranged to individually discharge into separate compartment or into a common duct system. The common duct 11 may be considered as conveying air under pressure to the cabin of an airplane. The superchargers 10 may be of any selected or required type and are adapted to be driven by separate or independent power sources such as aircraft engines 12. Discharge ducts 13 extend from the superchargers 10 to deliver the air under pressure to the common duct 11. Each discharge duct 13 has a check valve V for preventing a reverse flow of air. The check valves V illustrated, each include a housing or body 14 interposed in the respective duct 13. Each valve housing 14 has an end plate 15 which carries a valve seat 16 adapted to be engaged by the closure or door 17 of the valve. The check valve doors 17 are generally disc shaped parts secured to the end plates 15 by hinge connections 18 so as to be freely swingable between the closed positions and open or partially open positions under the influence of air flow through the ducts 13. The valve doors 17 are provided with somewhat resilient bracket members 19 for suspending them from the hinges 18. The members 19 are adapted to flex so that the doors 17 may evenly seat or engage against the seats 16.

The apparatus or system of the invention further includes pilot valves P associated with the check valves V to be actuated or controlled thereby and relief valves R for the ducts 13 controlled by the pilot valves. A pilot valve P is associated with each check valve V in a manner to be actuated by its door 17. Each pilot valve P includes an elongate valve body 20 secured on the exterior of the plate 15 of the check valve. The valve body 20 has a passage 21 communicating with an opening 22 in the wall of the plate 15. The opening 22 communicates with the interior of the check valve body 14 and thus has communication with the discharge duct 13. It will be observed that the opening 22 and passage 21 communicate with the portion of the duct 13 at the downstream side of the check valve door 17, assuming the door to be in the closed position. A lateral or transverse port 23 in the pilot valve body 20 connects the passage 21 with a pipe or line 24 which extends to the related relief valve R will be later described.

Each pilot valve P further includes a pin or valve member 25 shiftable axially in an opening or bore 26 in the body 20. The bore 26 intersects the lateral port 23 so that the member 25 is adapted to control communication between the downstream portion of the duct 13 and the line 24. An annular groove 27 is formed in the member 25 and the member is adapted to be shifted axially between a closed position where it closes off the lateral port 23 and the open position of Figure 4 where its groove 27 registers with the lateral port to allow the flow of air pressure from the downstream portion of the duct 13 to the line 24. The valve member 25 extends through the abovementioned opening 22 in the plate 15 to project into the check valve housing 14. The projecting end of the member 25 is rounded off or made partially spherical to cooperate with the check valve door 17. The member 25 engages the door 17 at a point adjacent but spaced from the hinge connection 18 so that the member is shifted axially in one direction when the door moves toward its closed position. A spring 28 is arranged under compression between the other end of the member 25 and a plug 29 screw-threaded in the outer end of the valve body 20. The spring 28 occupies a chamber 30 in the body 20 and serves to move the valve member 25 in the other direction when the door 17 moves toward its open position. The spring 28 also serves to hold the member 25 in the closed position when the door member 19 is out of contact with the valve member 25. A shoulder 9 on the member 25 is engageable with the end wall of the chamber 30 to stop the member 25 in its fully closed position.

As illustrated in Figure 4, the groove 27 is positioned to register or communicate with the lateral port 23 when the door 17 is in the closed position and is of sufficient axial extent to remain in communication with the lateral port throughout a considerable movement of the door. Thus the relationship between the lateral port 23 and the groove 27 is such that air under pressure from the duct 13 at the downstream side of the door 17 is admitted to the line 24 when the door 17 assumes a partially closed position by reason of limited air flow through the duct in the downstream direction. In practice, when air flow from the related supercharger 10 reaches a low value where there is insufficient flow to cool the supercharger, gravity acting on the flow-sensitive door 17 causes the door to assume a position where the groove 27 of the pilot valve communicates with the lateral port 23 to allow air under pressure to flow into the line 24.

It is preferred to balance the pilot valves P so that they readily respond to movement of the door 17. The inactive end of the pilot valve members 25 extend into the adjacent chambers 30. The abovementioned passages 21 communicate with the chambers 30 at 31 so that air pressures of substantially equal value are imposed on the opposite ends of the valve members 25 to balance the valves. The abovementioned springs 28 imposed only a very light load on the valve members 25 and therefore do not interfere with or resist movement of the gravity and flow sensitive doors 17 of the check valves V.

A flow maintaining or relief valve R is provided for each discharge duct 13 and is arranged at the upstream side of the related pilot valve P. While the relief valves R may be of any suitable type, we prefer to employ valves that are urged closed by the air pressure in the ducts 13 and that are adapted to be opened by fluid pressure actuated units such as pistons or diaphragms. Each duct 13 has a fitting 32 secured to the duct around an opening 33 therein. Spaced bolts 34, or the equivalent, secure seat members 35 to the fittings 32. Each seat member 35 has an outwardly extending tubular part 36 and an inwardly facing annular seat 37. The relief valves R each further include a valve or closeure 38 provided with spaced outwardly extending guides 40 which slidably operate in the tubular parts 36 of the seat members. The closures 38 are disc like parts provided at their peripheries with washers 41 for sealing with the seats 37. The valve closures 38 face inwardly or toward the centers of the ducts 13 to be urged outwardly toward their respective seats 37 by the air pressure and outward flow through the tubular guide parts 36. The guide parts 36 may spill or discharge the air under pressure into the atmosphere. A stem 42 extends outwardly from the closure 38 of each relief valve R.

In the embodiment of our invention illustrated in Figures 1 to 4 inclusive, the means for actuating or opening the relief valves R, in response to air under pressure received from the related pilot valves P, are in the nature of diaphragm mechanisms. Each of these diaphragm units includes a diaphragm housing made of two sections 43 and 44 and a flexible diaphragm 45 secured between the peripheral portions of the housing sections. Rods or bolts 46 mount the diaphragm units on the relief valve assemblies and aid in clamping the peripheral portions of the sections together to secure the diaphragms 45 therebetween. In the particular arrangement illustrated the bolts carry spacer tubes 47 and mount the diaphragm units on plates 48 so that the peripheral parts of the housing sections 43 and 44 are clamped between the bolt heads and the ends of the spaced tubes. The stems 42 of the relief valves R pass through openings in the sections 43 and discs 49 secure the diaphragms 45 to the stems. The walls of the lower diaphragm housing sections 43 are perforated as at 50 so that the lower sides of the diaphragms 45 are subjected to atmospheric pressure. The above described lines 24 from the related pilot valves P connect with fittings 51 on the upper housing sections 44 so that the upper sides of the diaphragms 45 are subjected to air pressure admitted by the lines 24. Bleed orifices 52 of limited capacity are provided in the walls of the upper sections 44 to permit the air pressure above the diaphragms to bleed out when the related pilot valves P close. This permits the relief valve closures 38 to move upwardly against their seats 37.

In the operation of the system illustrated in Figures 1 to 4 inclusive, the superchargers 10 are normally driven at a sufficient rotative speed and the speed of their driving engines 12 is sufficiently well matched or coordinated to cause ample air flow through the superchargers to insure adequate cooling of the same. However, during actual ground operating or flight conditions the air flow through one or more of the superchargers 10 may fall below a value required for their cooling. This may occur by reason of substantial obstruction to air flow through the ducts 11 or 13 or may be occasioned where the superchargers have variable speed drives and one driving engine 12 is operated at a considerably slower speed than the other. In the latter case the output of the supercharger 10 driven by the engine 12 operating at the higher speed, will be sufficiently greater than the output of the other supercharger 10 to cause a back pressure to develop in the discharge duct 13 of the slower supercharger and there will be only a quite limited air flow through the latter. In any event, whenever the air flow through a discharge duct 13 falls below a value sufficient to adequately cool the related supercharger 10, the door 17 of the check valve V in that duct moves toward the closed position. This movement of the door 17 shifts the pilot valve member 25 to a position where its groove 27 communicates with the lateral port 23. The parts are related so that the pilot valve P does not open until the air flow outwardly through the duct 13 has reached such a low value that there is danger of the related supercharger 10 overheating because of insufficient air flow. Opening of the pilot valve P allows air under pressure from the downstream side of the check valve V to flow through the line 24 to the diaphragm housing section 44 to act on the upper side of the diaphragm 45. The diaphragm 45 has an effective area considerably larger than the effective area of the closure 38 of the relief valve R and pressure on the upper or outer side of the diaphragm opens the relief valve. This allows air under pressure from the duct 13 to escape through the seat member 36 to the atmosphere and a sufficient flow of air is thus established in the duct 13 and the supercharger 10 to properly cool the supercharger.

The relief valve R remains open so long as the door 17 of the check valve V remains in the position where the pilot valve P is open. When a normal flow or a flow adequate for cooling of the related supercharger 10 is reestablished through the supercharger, the door 17 of the check valve V may remain in the position where the pilot valve P is at least partially open. This is because a certain proportion of the air flow from the supercharger 10 escapes to the atmosphere through the relief valve R and full air flow from the supercharger is not imposed on the door 17 of the check valve V. However, when the air flow from the related supercharger 10 is somewhat in excess of that required for its proper cooling, the major proportion of the aggregate flow reaching the door 17 is sufficient to move the door to a position where the pilot valve P is closed. Upon closing of the pilot valve P the air under pressure above the diaphragm 45 slowly leaks out through the bleed 52 and the relief valve closure 38 closes against its seat 37 by the action of the internal flow and air pressure in the duct 13. The somewhat delayed closing of the pilot valve P and the delayed closing of the relief valve R prevent "hunting" of the system and oscillation of the door 17 when flow through the duct 13 approaches and reaches that required for cooling of the related supercharger 10. Thus the valve and duct system has what may be termed an "over-center action" for preventing "hunting" of the valves. The operation of the valve systems in the various ducts 13 is the same as above described and the valve systems may operate individually or simultaneously, depending upon the nature of the fault in the duct system.

Figures 5 and 6 illustrate a form of the invention characterized by a relief valve for a duct 13 operated directly by the flow sensing check valve. In the simplified drawing of this form of the invention, the check valve 60 has a suitable housing 61 connected in the supercharger discharge duct 13. The interior of the housing 61 carries an annular valve seat 62 which faces downstream in relation to the air flow from the supercharger. The closure or door 59 of the check valve 60 is hinged or pivoted in the housing 61 at 63 so as to be movable between the open full line position and the closed broken line position of Figure 5 in response to air flow through the ducts.

The relief valve 64 of Figures 5 and 6 includes a housing or shell 65 projecting radially from the check valve housing 61 or the duct 13. The shell 65 has its inner end open to the interior of the duct 13 adjacent the hinge mounting 63 and its outer end is closed by a threaded cap 66. A series of circumferentially spaced ports 67 is provided in the inner wall portion of the shell and the ports are open to the atmosphere. The relief valve 64 further includes a valve member 68 movable axially in the shell 65 and adapted to control the ports 67. The member 68 may be a cup-shaped element closed at its inner end and having an annular outwardly projecting rim 69 on its outer end. The rim 69 is engageable with a shoulder 74 on the interior of the shell 65 to limit inward travel of the member 68. A light spring 72 is arranged under compression between the cap 66 and the inner end wall of the cup-shaped member 68 to urge the member to the closed position where the ports 67 are closed. In accordance with the invention, the door 59 of the check valve 60 serves to move the member 68 outwardly when the check valve door 59 moves toward the closed position. A lug 70 projects from the inner end of the valve member 68 and is engaged by an arm 71 on the door 59. These parts are related so that when the door 59 is in the open full line position of Figure 5 the spring 72 holds the member 68 inwardly to close the ports 67. When the door 59 moves from this full line position towards the closed position, the valve member 68 is shifted outwardly to uncover the ports 67. It is preferred to pressure balance the relief valve member 68. A port 73 extends radially outward through the wall of the shell 65 to the abovementioned shoulder 74. The port 73 maintains the space above the member 68 in communication with the interior of the duct 13 so that the pressures on the opposite sides of the valve member are substantially balanced.

In the operation of the structure shown in Figures 5 and 6, the air flow from the related superchanger 10 normally holds the check valve door 59 in the open or partially open position where the valve member 68 closes the ports 67. When the air flow through the supercharger and the duct 13 is reduced to a value insufficient to adequately cool the supercharger, the door 59 of the check valve automatically moves toward its seat 62. This movement of the door 59 moves the valve member 68 outwardly to uncover the ports 67. This permits air under pressure to escape through the ports 67 to the atmosphere increasing the air flow through the duct 13 and supercharger to a value sufficient to properly cool the supercharger. When the air flow through the supercharger and duct 13 returns to normal or reaches a value sufficient to cool the supercharger the door member 59 is moved toward the open position or away from its seat 62 by the increased air flow. When this occurs the spring 72 returns the valve member 68 to the position where it closes off the ports 67.

Figure 7 illustrates another embodiment of the invention wherein the check valve is directly associated with the relief valve. In fact, in this construction, the check valve and the relief valve are integral or intimately related. The check valve includes a housing 80 connected in the duct 13 of the related supercharger 10 and provided with an annular seat 81. A tangentially disposed bore 82 is formed in the wall of the housing 80 and is radially offset from the seat 81. A generally cylindrical closure member 83 is supported in the bore 82 for free angular or turning movement. A shaft or axle 87 may support the member 83 in the bore 82 for free angular movement. The door 84 of the check valve is secured to this member 83. The member 83 forms the fulcrum or pivot element for the door allowing the door to move between the open and closed positions under the action of air flow in the duct 13. The relief valve means includes a port 85 intersecting the bore 82 and having its inner end in communication with the duct 13 at the upstream side of the seat 81 and its outer end open to the atmosphere. The abovementioned member 83 constitutes the closure element of the relief valve and serves to control the port 85. A side portion of the member 83 is relieved or cut away to have an open sector 86. The parts are related so that the member 83 closes the port 85 when the door 84 is held in the open position by air flow through the duct 13 sufficient to adequately cool the related supercharger. When the check valve door 84 moves toward the closed position the open sector of the member 83 comes into register with the port 85 to allow the escape of air under pressure from the duct 13. This provides additional air flow through the supercharger 10 sufficient to insure proper cooling. When the flow through the duct 13 returns to normal or is sufficient to provide adequate cooling for the related supercharger 10, the check valve door 84 is moved away from the seat 81 by the increased air flow. This movement of the door 84 moves or turns the member 83 to the position where it closes the relief port 85.

It is believed that it will be readily understood how the structures of Figures 5 and 6 and Figure 7 may be incorporated in a duct system such as shown in Figure 1.

Having described only typical preferred embodiments of our invention we do not wish to be limited to the particular details set forth, but wish to reserve to ourselves any features or modifications that may fall within the scope of the following claims.

We claim:

1. In combination with a supercharger having a discharge duct, a relief valve mounted in the wall of said duct and urged to the closed position by the air pressure in the duct and operable when open to discharge into the atmosphere to promote airflow through the supercharger, a check valve preventing a reverse flow through the duct including a seat in the duct, a door engageable with the seat to close off the duct, a bracket on the door, and a hinge connecting the bracket with a wall of said duct so that the door is moved toward its closed position against the seat by reverse flow in the duct, a fluid pressure actuated device operatively connected to the relief valve for moving the relief valve to the open position, a pressure line having communication with the duct at the downstream side of said seat and leading to said device to supply actuating pressure thereto, a pilot valve having a casing fixed to said duct, said pilot valve controlling said pressure line and directly engaging said bracket at a point spaced from said hinge mounting to be moved to an open position to cause opening of the relief valve when the outward airflow in the duct falls below a given value to allow movement of the door toward its closed position, and a spring seated in said casing and urging the pilot valve against the bracket and moving the pilot valve to the closed position when the door again is moved toward the open position by increased outward airflow in the duct.

2. In combination with a supercharger having a discharge duct, a relief valve mounted in the wall of said duct and urged to the closed position by the air pressure in the duct and operable when open to discharge into the atmosphere to promote airflow through the supercharger, a check valve preventing a reverse flow through the duct including a seat in the duct, a door engageable with the seat to close off the duct, a bracket on the door, and a hinge connecting the bracket with a wall of said duct so that the door is moved toward its closed position against the seat by reverse flow in the duct, a fluid pressure actuated device operatively connected to the relief valve for moving the valve to the open position, a pressure line having communication with the duct at the downstream side of said seat and leading to said device to supply actuating pressure thereto, a pilot valve having a casing fixed to said duct, said pilot valve controlling said pressure line and directly engaging said bracket at a point spaced from said hinge mounting to be moved to an open position to cause opening of the relief valve when the outward airflow in the duct falls below a given value to allow movement of the door toward its closed position, a spring seated in said casing and urging the pilot valve against the bracket and moving the pilot valve to the closed position when the door again is moved toward the open position by increased outward airflow in the duct, and a constant pressure bleed for said pressure actuated device to prevent hunting of the door and pilot valve.

3. In combination with a supercharger having a discharge duct, a relief valve mounted in the wall of said duct to discharge air pressure from the duct to promote air flow through the supercharger, the relief valve comprising a valve seat mounted in a wall of said duct facing inwardly relative to the duct, and a valve closure adapted to seal outwardly against the seat and adapted to move inwardly to open to the atmosphere, a check valve in the discharge duct in downstream relation to the relief valve for preventing the reverse flow of air through the duct including a door hinged in the duct, diaphragm means operatively connected to said relief valve, a pressure line for conveying air pressure from the duct to the diaphragm means to operate the same, a pilot valve having a casing fixed to said duct, said pilot valve controlling said pressure line and having an end extending into said duct and engageable with said door to admit pressure to the diaphragm means to open the relief valve when the outward flow in the duct reaches a given low value, and means for conducting pressure from the duct to the other end of the pilot valve to pressure balance the pilot valve, and a spring seated in said casing and maintaining the pilot valve in engagement with the door and for moving the pilot valve to the closed position when the outward airflow through the duct increases to swing the door open.

4. In combination with a supercharger having a discharge duct, a check valve for preventing a reverse flow through the duct comprising a housing connected to the duct having an inlet and outlet, a closure for said inlet pivotally mounted on said housing, an aperture in said housing, a pilot casing mounted on said housing at said aperture, a pilot valve resiliently mounted in said casing and extending through said aperture for engaging said pivoted closure, a port in said pilot casing opened or closed by said pilot valve for controlling the flow of air from the housing to the pilot casing, a pipe connected at one end to said port, a valve actuating mechanism comprising an upper and lower section, the other end of said pipe connected to said upper section, a bleed hole in said upper section, a bleed hole in said lower section larger than that in said upper section, a diaphragm clamped between said sections, a stem having one end attached to said diaphragm and passing through said lower section and into said duct, a closure secured to said other end, guides mounted on said stem and closure, a tubular fitting acting as a sleeve for said guides mounted upstream of said check valve in a wall of said duct, spacers connecting said sections with said fitting, a sealing member on said closure to cooperate with said fitting when said door is open to prevent escape of pressure and to disengage from said fitting when said door is closed to allow for escape of pressure.

BERNARD L. MESSINGER.
HOWARD H. GRAY.
ROBERT R. RICHOLT.

References Cited in the file of this patent

UNITED STATES PATENTS

| Number | Name | Date |
|---|---|---|
| 859,341 | Scheier | July 9, 1907 |
| 1,052,172 | Rateau | Feb. 4, 1913 |
| 1,210,030 | Baumann | Dec. 26, 1916 |
| 1,222,352 | Banner | Apr. 10, 1917 |
| 1,267,880 | McBride | May 28, 1918 |
| 1,280,477 | Hopkins | Oct. 1, 1918 |
| 2,000,721 | Standerwick | May 7, 1935 |
| 2,380,777 | Moss | July 31, 1945 |
| 2,451,835 | Johnson | Oct. 19, 1948 |

FOREIGN PATENTS

| Number | Country | Date |
|---|---|---|
| 26,987 | Great Britain | 1913 |
| 344,737 | Great Britain | Mar. 12, 1931 |